United States Patent
Lege et al.

(10) Patent No.: US 12,472,809 B2
(45) Date of Patent: Nov. 18, 2025

(54) HYBRID REAR AXLE DRIVE

(71) Applicant: AUDI AG, Ingolstadt (DE)

(72) Inventors: Peer Christopher Lege, Kronau (DE); Christian Fritz, Mosbach (DE); Andreas Amann, Reilingen (DE); Markus Von Berg, Oberderdingen (DE); Matthieu Kinnel, Heilbronn-Sontheim (DE); Philipp Dohmann, Sinsheim (DE)

(73) Assignee: Audi AG, Ingolstadt (DE)

( * ) Notice: Subject to any disclaimer, the term of this patent is extended or adjusted under 35 U.S.C. 154(b) by 238 days.

(21) Appl. No.: 18/063,004

(22) Filed: Dec. 7, 2022

(65) Prior Publication Data
US 2023/0173911 A1   Jun. 8, 2023

(30) Foreign Application Priority Data

Dec. 8, 2021   (DE) .......................... 102021132321.5

(51) Int. Cl.
| | |
|---|---|
| *B60K 6/445* | (2007.10) |
| *B60K 6/26* | (2007.10) |
| *B60K 6/365* | (2007.10) |
| *B60K 17/16* | (2006.01) |
| *F16H 48/06* | (2006.01) |
| *F16H 48/36* | (2012.01) |

(52) U.S. Cl.
CPC ................ *B60K 6/445* (2013.01); *B60K 6/26* (2013.01); *B60K 6/365* (2013.01); *B60K 17/16* (2013.01)

(58) Field of Classification Search
CPC .... F16H 48/08; F16H 2048/364; F16H 48/36; B60K 6/445; B60K 6/26; B60K 6/365; B60K 17/16; B60K 2006/4808; B60K 2006/4833; B60K 2023/043; B60K 23/04; B60K 1/00; B60K 6/48; B60K 2001/001; B60K 6/54
See application file for complete search history.

(56) References Cited

U.S. PATENT DOCUMENTS

| | | | | |
|---|---|---|---|---|
| 698,188 | A | * | 4/1902 | Steward et al. ....... A01D 34/03 192/21 |
| 11,034,232 | B2 | * | 6/2021 | Nilsson .................... B60K 6/48 |
| 2009/0197727 | A1 | | 8/2009 | Janson |
| 2015/0087476 | A1 | | 3/2015 | Dzafic et al. |
| 2017/0059023 | A1 | * | 3/2017 | Severinsson ......... B60K 17/165 |
| 2019/0366842 | A1 | * | 12/2019 | Hofer ...................... B60K 6/40 |

FOREIGN PATENT DOCUMENTS

| | | | | |
|---|---|---|---|---|
| AT | 006549 U1 | * | 12/2003 | ............... B60K 6/02 |
| DE | 102009059903 A1 | | 6/2011 | |
| DE | 102013205175 A1 | | 9/2014 | |
| DE | 102018206411 A1 | * | 10/2019 | ............... B60K 1/00 |
| DE | 102019129670 A1 | | 5/2020 | |
| WO | WO 2015169837 A1 | | 11/2015 | |

* cited by examiner

*Primary Examiner* — Tisha D Lewis
(74) *Attorney, Agent, or Firm* — Seed Intellectual Property Law Group LLP

(57) ABSTRACT

A hybridized rear axle drive (H-RAD) includes an electrical torque vectoring system (eTV) and a drive train for a motor vehicle, especially a plug-in hybrid vehicle (PHEV), and is configured to perform a method for electric torque distribution (electric torque vectoring).

8 Claims, 1 Drawing Sheet

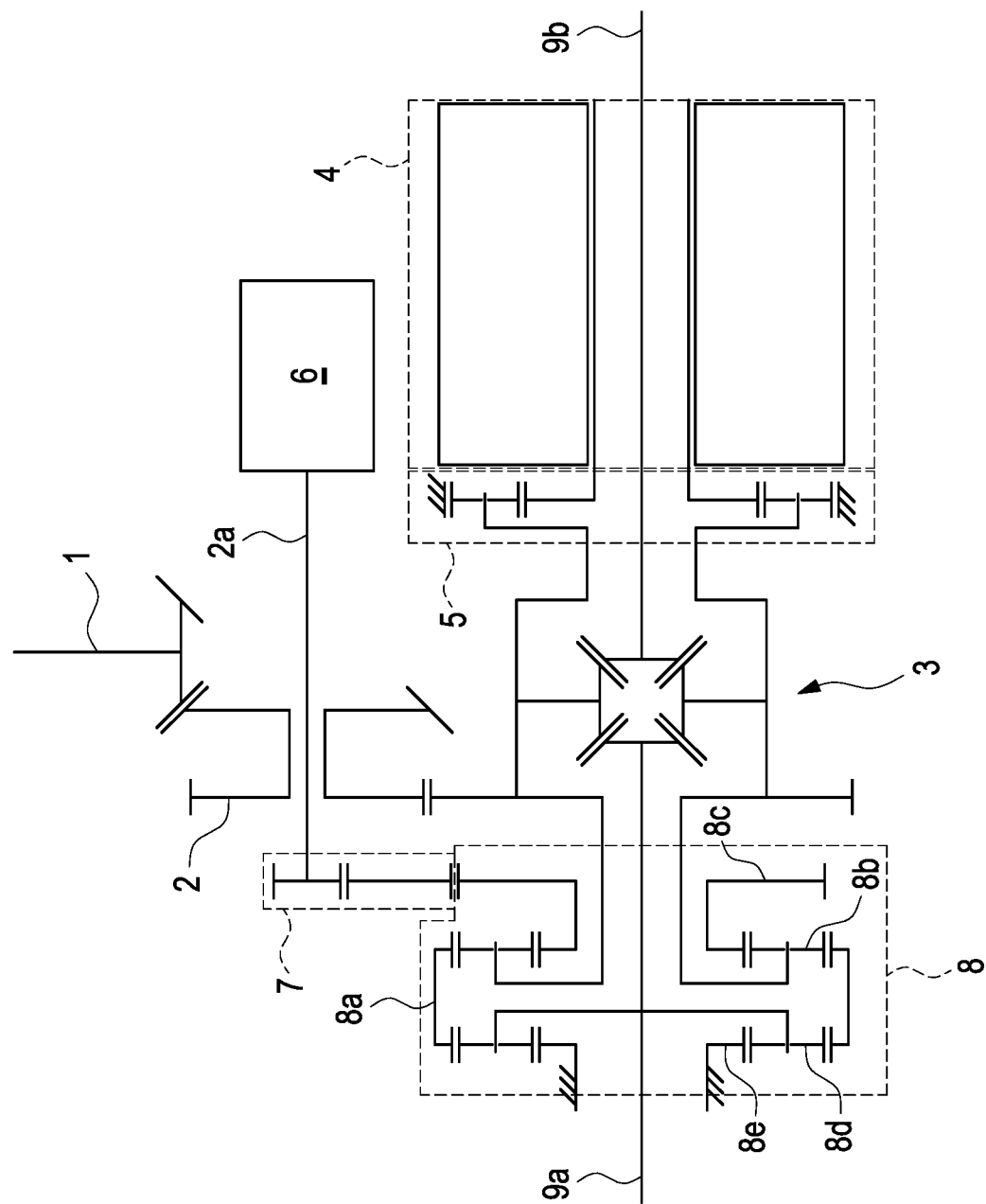

ial Field

Embodiments of the invention relate to a hybridized rear axle drive (H-RAD) having an electrical torque vectoring system (eTV), a drive train for a motor vehicle, especially a plug-in hybrid vehicle (PHEV), and a method for electric torque distribution (electric torque vectoring).

Description of the Related Art

A conventional rear axle drive (RAD) with torque vectoring (TV) consists of a conventional axle gearing and superimposing units, arranged on the left and right side. A superimposing unit consists of the superimposing gear and a multi-plate clutch. With the aid of the integrated multi-plate clutches, the superimposing gears can distribute the drive power variably between the wheels of the rear axle within the system limits. The multi-plate clutches are activated by a hydraulic control unit. An electric motor drives an oil pump, which provides the necessary hydraulic pressure. All functions are controlled and monitored by a separate controller. The superimposing gear consists of two coaxially arranged ring gearings with a reduction ratio (i1>1) and a step-up ratio (i2<1). With the help of the superimposing gear, depending on the force locking of the multi-plate clutch it is possible to engage additional torque, connected with an increase in rotary speed. Thus, there is an increase in the power transmission. The differential torque which can be transmitted is dependent on the maximum torque which can be transmitted by the multi-plate clutches. Thus, the design space, through the maximum diameter for the multi-plate packs, also defines the maximum differential torque. In connection with large vehicle weight (e.g., for PHEVs), the differential torque of a RAD with TV through superimposing units having multi-plate clutches is not enough to achieve an adequate dynamization of the driving behavior in the direction of a sports vehicle. Since only an increasing of the rotary speed of one wheel can be generated through the superimposing units with multi-plate clutches, no stabilizing interventions in the driving dynamics (which is desirable when entering a curve) are possible.

A hybridized 2-speed rear axle drive (H-RAD) with differential lock has a conventional bevel gear differential, which is connected across a Cardan shaft to the center differential. In addition, through a 2-speed gearbox, an electric motor (in P4 layout) can act on the crown wheel of the differential. The bevel gear differential is designed around a differential lock with a hydraulically operated multi-plate clutch. In connection with a hang-on center differential (not part of the H-RAD) for more agile driving dynamics, the differential lock can be engaged to provide stabilization. Thus, the driving dynamics when exiting from a curve can be influenced toward a dynamically perceived, oversteering driving behavior. The design of the linkage of the P4 e-machine to the drive train across a 2-speed gearbox requires a shifting at the rear axle in addition to the shifting in the main transmission. This necessitates an interruption in the traction for the drive torque of the P4 e-machine. Due to this additional shifting on the rear axle, the comfort and dynamics of the vehicle are equally negatively affected. The differential lock on the rear axle will always provide a stabilizing effect in the area of driving dynamics when exiting a curve in the case of an all-wheel driven vehicle. In order to provide an agile sporty driving behavior for the vehicle, the use of a hang-on center differential is also necessary. A more agile influencing of the driving dynamics is only possible with the variable distribution of the drive torque in the hang-on center differential.

WO 2015/169 837 A1 discloses a torque vectoring device for a vehicle, comprising an electric motor, which is connected across a gearing to a differential mechanism, wherein the torque vectoring device moreover comprises at least one control means for changing the torque pathway of the gearing between a first mode, in which the gearing connects the electric motor to the input shaft of the differential mechanism for the hybrid drive mode, and a second mode, in which the gearing connects the electric motor to the output shaft of the differential mechanism for the torque vectoring mode.

DE 10 2019 129 670 A1 concerns a hybrid axle drive with torque vectoring. An electric axle drive unit uses an electric motor in order to drive both stub axles across a final drive gear and a differential. A torque vectoring gear changes the torque distribution by transferring power from one of the stub shafts to the electric motor or from the electric motor to the stub shaft in response to the engagement of the brakes. Both the final drive gear and the torque vectoring gear are implemented by the use of stepped planetary gear sets. The final drive gear and the differential are located at one end of the electric motor. The torque vectoring gear is located at the opposite end of the electric motor.

DE 10 2009 059 903 A1 discloses a system for variable torque distribution within at least one axle of a motor vehicle comprising a main drive and a torque vectoring motor.

BRIEF SUMMARY

Some embodiments provide a rear axle drive and a drive train for a plug-in hybrid vehicle (PHEV), with which a driving behavior with high driving dynamics can be achieved, especially also when negotiating curves.

In some embodiments, in order to further boost the performance of a PHEV drive train, a hybridized rear axle drive (H-RAD) having an electric torque vectoring system (eTV) is used. In addition to the conventional mechanical drive by means of a Cardan shaft, a permanently linked and integrated electric motor with transmission gearing is used for boosted propulsion and for recuperation. Furthermore, a separate electric motor with integrated power electronics is used to operate an electric torque vectoring system (eTV). The eTV system serves both for enhancing the lateral dynamics and the driving stability. With the H-RAD, the overall system power is enhanced by a modular expansion of the drive train. The H-RAD has a modular design and variants are possible (electric traction motor and eTV system can be integrated individually).

Some embodiments include a rear axle drive for a motor vehicle, especially a PHEV, comprising a pinion shaft, a hollow shaft having bevel and spur gear toothing and a differential having a spur gear firmly attached to a casing of the differential, wherein the pinion shaft is connected to a Cardan shaft of the motor vehicle and the pinion of the pinion shaft engages with the bevel toothing of the hollow shaft and the spur gear toothing of the hollow shaft engages with the toothing of the spur gear of the differential.

The pinion shaft is connected to a Cardan shaft of the vehicle, which transfers a drive torque provided by a combustion engine and/or an electric motor of the vehicle. The hollow shaft is arranged transversely to the axis of the pinion shaft and to the longitudinal axis of the vehicle. The spur gear toothing of the hollow shaft transfers the drive torque to the differential. The hollow shaft forms a countershaft of the rear axle drive and enables an off-center arrangement of the differential. Thanks to the use of a countershaft, a larger design space is created for the integration of the electric traction motor and it is possible to avoid a hypoid offset of the bevel gear toothing. The lack of a hypoid offset, thanks to no shear effects in the bevel drive, results in a reduction of the power loss and makes it possible to use a single grade of oil for the entire rear axle drive (H-RAD).

In one embodiment of the rear axle drive, the differential has a linkage to a transmission gearing of an electric traction motor.

In one embodiment of the rear axle drive, a connecting shaft is led through the hollow shaft, comprising a spur gear which is part of a transmission gearing. In another embodiment, the transmission gearing is linked to an overlay unit, having a linkage to an output shaft of the differential. In another embodiment, the overlay unit comprises a two-row planetary gearing having a freewheeling single-piece ring gear for both sets of planetary gears. In another embodiment, the two-row planetary gearing comprises first planet gears and planet carriers with linkage to the casing of the differential, a first sun gear with linkage to the transmission gearing, second planet gears and planet carriers with linkage to one of the output shafts, and a casing-fixed second sun gear.

In one embodiment, the rear axle drive comprises a lubrication system based on geared oil delivery to an oil reservoir and subsequent gravity-driven oil distribution to the lubrication sites.

Some embodiments include a drive train for a plug-in hybrid vehicle (PHEV), comprising a combustion engine and at least one electric traction motor as well as a rear axle drive as described herein.

In one embodiment of the drive train, an electric traction motor is linked to the differential across a transmission gearing. In one embodiment, the electric traction motor is a permanently attached electric traction motor having a constant gear ratio (1 speed). The benefits of a permanent linkage of the electric traction motor include minimizing of dead time in the boost and recuperation mode, elimination of traction interruptions due to shifting processes, and a weight savings thanks to eliminating the shift mechanisms.

In one embodiment of the drive train, a drive module (eTV drive module) comprising an electric motor and a power electronics is linked to the differential of the rear axle drive across a connecting shaft, a transmission gearing, and an overlay unit. Thus, the eTV system consists of an eTV drive module (electric motor and integrated power electronics) and a mechanical overlay unit.

In one embodiment, the electric traction motor and the eTV drive module are cooled by means of an active water cooling.

Some embodiments include a method for torque distribution (electric torque vectoring, eTV) between two output shafts of a rear axle of a motor vehicle, especially a PHEV. In the method, a drive module (eTV drive module) produces an acceleration or deceleration of an output shaft connected to the second planet carrier of the overlay unit through a transmission gearing (eTV transmission gearing) and an overlay unit (eTV overlay unit) having a two-row planetary gear box, comprising first planet gears and planet carriers with linkage to the casing of a differential, a first sun gear with linkage to the transmission gearing, second planet gears and planet carriers with linkage to one of the output shafts, and a casing-fixed second sun gear. The drive module comprises an electric motor and a power electronics.

The benefits of an electric torque vectoring system include large differential torques produced in the compact design space, better regulating ability as compared to hydraulic systems, and the possibility of intervention in the driving dynamics of the vehicle to accelerate and decelerate the rear wheels (always oppositely directed) and thus provide greater agility and stabilization.

Further benefits and configurations will emerge from the description and the accompanying drawing.

Of course, the features mentioned above and yet to be explained below can be used not only in the particular indicated combination, but also in other combinations or standing alone, without leaving the scope of the present disclosure.

BRIEF DESCRIPTION OF THE SEVERAL VIEWS OF THE DRAWINGS

Embodiments are presented schematically with the aid of the drawing and shall be further described with reference to the drawing.

FIG. 1 shows a schematic representation of one embodiment of a hybrid rear axle drive (H-RAD) with electronic torque vectoring (eTV).

DETAILED DESCRIPTION

FIG. 1 shows a schematic representation of one embodiment of the hybrid rear axle drive (H-RAD) with electronic torque vectoring (eTV).

A pinion shaft 1 is the interface with the Cardan shaft in the vehicle. A bevel/spur gear shaft 2 with drive-through to an eTV module 6 is a transversely situated hollow shaft with bevel and spur gear toothing having drive-through for a connecting shaft 2a from the eTV drive module 6 to an eTV transmission gearing 7. A differential 3 with spur gear comprises a differential casing with firmly attached spur gear, a linkage to an eTV overlay unit 8 and to the transmission gearing 5 of an electric traction motor 4. The equalizing of rotary speeds occurs by a design as a bevel gear differential. An electric traction motor 4 is permanently connected to a transmission gearing 5. The transmission gearing 5 of the electric traction motor 4 comprises a planetary gearing and is permanently connected to the casing of the differential 3. The planetary gearing is designed such that the sun gear is linked to the drive shaft of the electric traction motor 4, the planet gears and planet carriers produce the linkage to the casing of the differential 3, and the ring gear casing is firmly attached. A drive module 6 for the electric torque vectoring comprises an electric motor with integrated power electronics. A form-fitted connection to the eTV transmission gearing 7 exists by means of splines. The eTV transmission gearing 7 has various spur gear stages. The eTV overlay unit 8 comprises a 2-row planetary gearing with a freewheeling single-piece ring gear 8a for both sets of planet gears and right-side planet carriers 8b with linkage to the casing of the differential 3, a right-side sun gear 8c with linkage to the eTV drive module 6 across the eTV transmission gearing 7, left-side planet gears and planet carriers 8d with linkage to a left output shaft 9a, and a left-side sun gear 8e, which is firmly attached to the casing. The left-side output shaft 9a and the right-side output shaft 9b form the interfaces with the Cardan shafts in the vehicle.

During the electric torque vectoring (eTV), the eTV drive module 6 brings about a specific redistribution of the drive torques between the wheels, depending on the direction of turning, in concert with the eTV overlay unit 8. The increasing or reducing of the particular wheel torque occurs here in alternation and to the same degree of magnitude. The eTV drive module 6 drives the right sun gear 8c of the overlay unit 8 across the eTV transmission gearing 7. The sun gear 8c drives the ring gear 8a across the right planet gear set 8b and the left planet gear set 8d. In this way, depending on the direction of turning of the eTV drive module 6, an accelerating or a decelerating of the left planet carrier 8d and the linked left output shaft 9a will occur. The right output shaft 9b will be accelerated or decelerated in the same degree and oppositely in direction via the bevel toothing of the differential 3.

German patent application no. 10 2021 132321.5, filed Dec. 8, 2021, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A rear axle drive for a motor vehicle having a Cardan shaft, comprising:
   a pinion shaft having a pinion,
   a hollow shaft having bevel gear toothing and spur gear toothing,
   a differential having a differential spur gear firmly attached to a casing of the differential, and
   a connecting shaft that is led through the hollow shaft, the connecting shaft comprising a connecting shaft spur gear which is different from the differential spur gear and part of an electronic torque vectoring transmission gearing, wherein the rear axle drive is configured such that rotation of the connecting shaft is transmitted to the differential by way of the electronic torque vectoring transmission gearing,
   wherein the pinion shaft is connected to the Cardan shaft of the motor vehicle and the pinion of the pinion shaft engages with the bevel gear toothing of the hollow shaft and the spur gear toothing of the hollow shaft engages with toothing of the differential spur gear of the differential.

2. The rear axle drive according to claim 1, wherein the differential has a connection to a traction motor transmission gearing of an electric traction motor.

3. The rear axle drive according to claim 1, wherein the electronic torque vectoring transmission gearing is linked to an overlay unit, having a linkage to an output shaft of the differential.

4. The rear axle drive according to claim 3, wherein the overlay unit comprises a two-row planetary gearing having a freewheeling single-piece ring gear for both sets of planetary gears.

5. The rear axle drive according to claim 4, wherein the two-row planetary gearing comprises first planet gears and planet carriers with linkage to the casing of the differential, a first sun gear with linkage to the electronic torque vectoring transmission gearing, second planet gears and planet carriers with linkage to one of the output shafts and a casing-fixed second sun gear.

6. A drive train for a plug-in hybrid vehicle, comprising:
   a combustion engine,
   at least one electric traction motor, and
   a rear axle drive according to claim 1.

7. The drive train according to claim 6, wherein an electric traction motor is linked to the differential across a traction motor transmission gearing.

8. The drive train according to claim 6, wherein a drive module comprising an electric motor and a power electronics is linked to the differential across a connecting shaft, the electronic torque vectoring transmission gearing and an overlay unit.

* * * * *